(12) United States Patent
Edwards

(10) Patent No.: US 6,487,919 B1
(45) Date of Patent: Dec. 3, 2002

(54) TURBINE FLOW MONITORING DEVICE

(75) Inventor: Paul K. Edwards, Norwich (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/992,638

(22) Filed: Nov. 6, 2001

(51) Int. Cl.$^7$ .............................................. G01F 15/00
(52) U.S. Cl. ................................................... 73/861.77
(58) Field of Search ............................. 73/861.77, 187, 73/455, 861.87, 861.79

(56) References Cited

U.S. PATENT DOCUMENTS

| | | | |
|---|---|---|---|
| 3,364,743 A | 1/1968 | Clinton .................. 73/231 |
| 3,636,767 A | * 1/1972 | Duffy ....................... 324/174 |
| 3,771,363 A | 11/1973 | Stapler ..................... 73/229 |
| 3,880,003 A | 4/1975 | Jameson .................. 73/231 R |
| 3,898,883 A | * 8/1975 | Kozak et al. .............. 73/861.33 |
| 4,114,440 A | 9/1978 | Stapler ..................... 73/861.92 |
| 4,134,298 A | 1/1979 | Guthrie .................... 73/231 R |
| 4,275,291 A | 6/1981 | Feller ....................... 235/92 FL |
| 4,324,144 A | * 4/1982 | Miyata et al. ............ 73/861.77 |
| 4,393,724 A | 7/1983 | Werkmann et al. ...... 73/861.91 |
| 4,825,707 A | 5/1989 | Rosaen .................... 73/861.77 |
| 5,140,856 A | * 8/1992 | Larsen ...................... 416/144 |
| 5,259,251 A | 11/1993 | Brinster et al. .......... 73/861.77 |
| 5,728,949 A | * 3/1998 | McMillan et al. ....... 73/861.77 |
| 6,012,339 A | 1/2000 | Genack et al. .......... 73/861.77 |
| 6,098,456 A | 8/2000 | Munck ..................... 73/275 |
| 6,321,707 B1 | * 11/2001 | Dunn ....................... 123/179.3 |

* cited by examiner

*Primary Examiner*—Hezron Williams
*Assistant Examiner*—Jewel V. Thompson
(74) *Attorney, Agent, or Firm*—Lonnie Drayer; Patrick Steinnon

(57) ABSTRACT

A turbine type flow meter has a four-vaned plastic torpedo-shaped turbine mounted by portions of the plastic turbine within a housing between first and second bearings. The turbine supports a pair of magnets of the Neodymium-Iron-Boron type which rotate with the turbine. An upstream portion of the housing incorporates a sensor cavity, which is sealed from a flow cavity containing the turbine. A connector and an attached printed circuit board with a Hall effect sensor is mounted within the sensor cavity closely spaced from the rotating magnets. The sensor housing is constructed from two parts. Each part of the housing incorporates mating structures that are designed for joining by spin welding.

13 Claims, 3 Drawing Sheets

TURBINE FLOW MONITORING DEVICE

BACKGROUND OF THE INVENTION

The present invention relates to water flow monitors in general and in particular to flow monitors employing a turbine.

Measuring the flow of a fluid in a pipe can be difficult, depending on the level of accuracy required. A positive displacement pump is probably the most accurate conventional approach; however, such pumps are costly, cause a significant pressure drop and are relatively bulky. Simple paddlewheel type sensors may be of low-cost and have little resistance to the flow of fluid, but may suffer from a lack of accuracy over a wide range of fluid flow rates, particularly at low or very high flow rates.

Precision flow instruments employ a turbine that passes substantially all the flow. However, bearing friction can seriously impede accuracy at higher flow velocities. The typical solution is to over-design the bearings which support the flow turbine, with the result being a relatively expensive instrument not suitable for use in many commercial and consumer applications, such as boilers, shower pumps, and tank filling applications. Flow monitoring with relative precision is necessary for residential and commercial water meters. Flow monitoring can also detect problems within waterflow systems, and can allow modulation of water flow velocities with greater precision. Flow monitoring can be important in hot water heating systems where monitoring flow assures balanced heating. Flow monitoring can also be used to increase energy efficiency by, for example coordinating water flow with burner activation in a boiler. Monitoring of fluid flow through a pump can assure that adequate fluid flows are present for pump cooling and avoiding cavitation at the pump impeller.

What is needed is a turbine type flow monitor that is low-cost, relatively accurate, creates a relatively low-pressure drop, and is resistant to leaks.

SUMMARY OF THE INVENTION

The turbine type flow meter of the present invention has an in-line housing in which a four-vaned torpedo-shaped turbine is between a first bearing spaced along the axis of flow from a second bearing. The bearings are supported by a plurality of axially extending spokes. The turbine supports a pair of magnets that rotate with the turbine. An upstream portion of the housing incorporates a sensor cavity that is sealed from a flow cavity formed by the flow meter. The sensor cavity is closely spaced from the rotating magnets positioned on the turbine. Positioned within the sensor cavity is a printed circuit board on which a Hall effect sensor is mounted. A connector mounted to the circuit board extends from the sensor cavity. The circuit board is mounted within the sensor cavity so that the Hall effect sensor is positioned close to the rotating magnets of the turbine. A temperature sensor may also be mounted on the circuit board and the circuit board may be potted within the sensor cavity with polyurethane or epoxy.

The sensor housing is constructed from two parts: a first upstream part containing the sensor cavity, and a second downstream part containing the downstream bearing. Both the upstream part of the housing and the downstream part of the housing incorporate pipe fittings to allow the turbine housing to be readily positioned along a fluid flow pipe. The upstream housing and the downstream housing incorporate mating structures that are designed for joining by spin welding.

It is a feature of the present invention to provide a fluid flow sensor of low cost.

It is a further feature of the present invention to provide a fluid flow sensor, which monitors fluid temperature in addition to fluid flow rate.

It is a still further feature of the present invention to provide a fluid flow sensor, which is accurate at low fluid velocities.

It is a yet further feature of the present invention to provide a fluid flow sensor, which occupies little additional volume beyond the volume, occupied by the fluid piping.

Further features and advantages of the invention will be apparent from the following detailed description when taken in conjunction with the accompanying drawings.

DETAILED DESCRIPTION OF THE INVENTION

Figure 1:
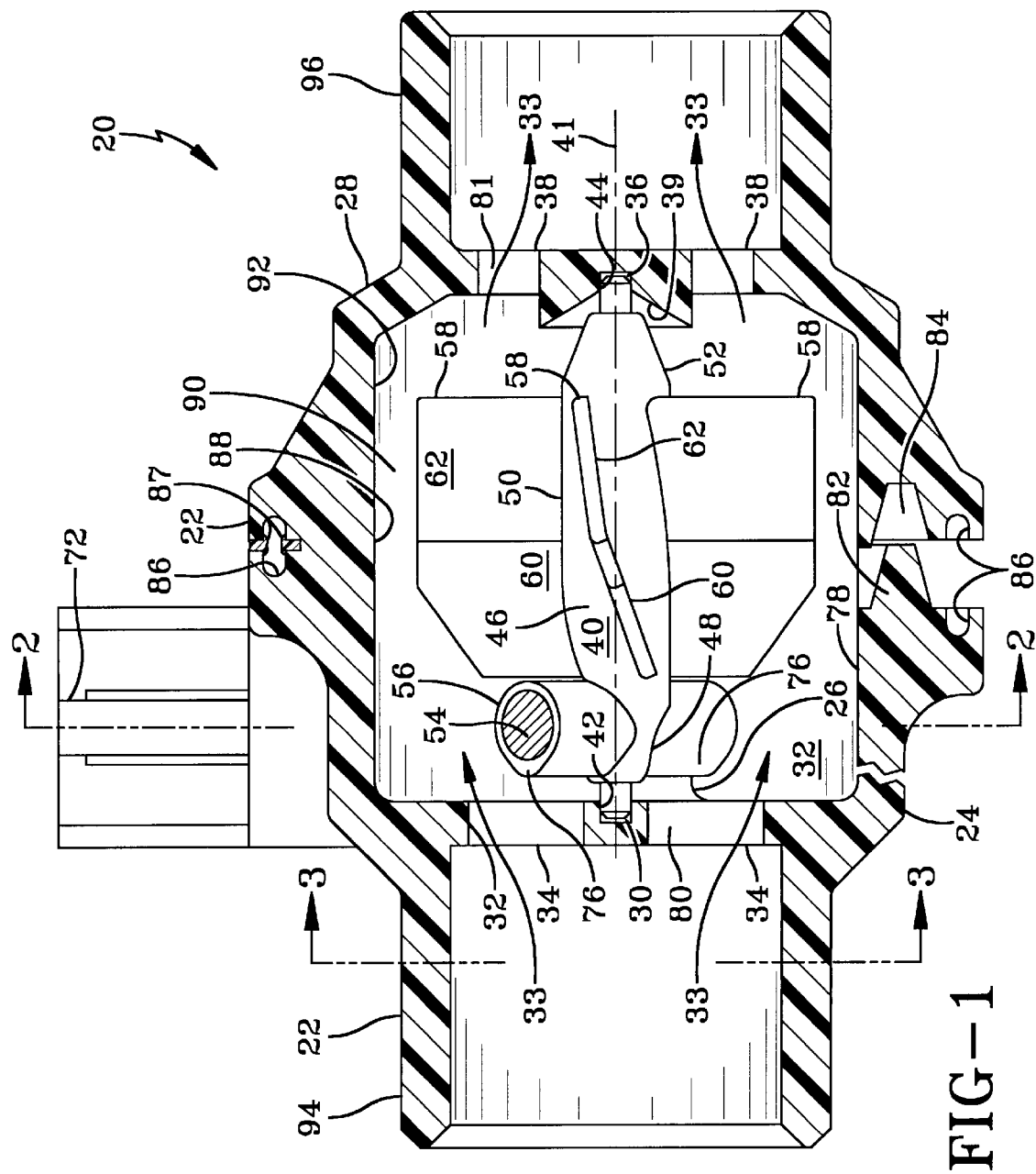
FIG. 1 is a side elevation cross-sectional view of the device of this invention partially broken away to show spin forming a joint.
Figure 2:
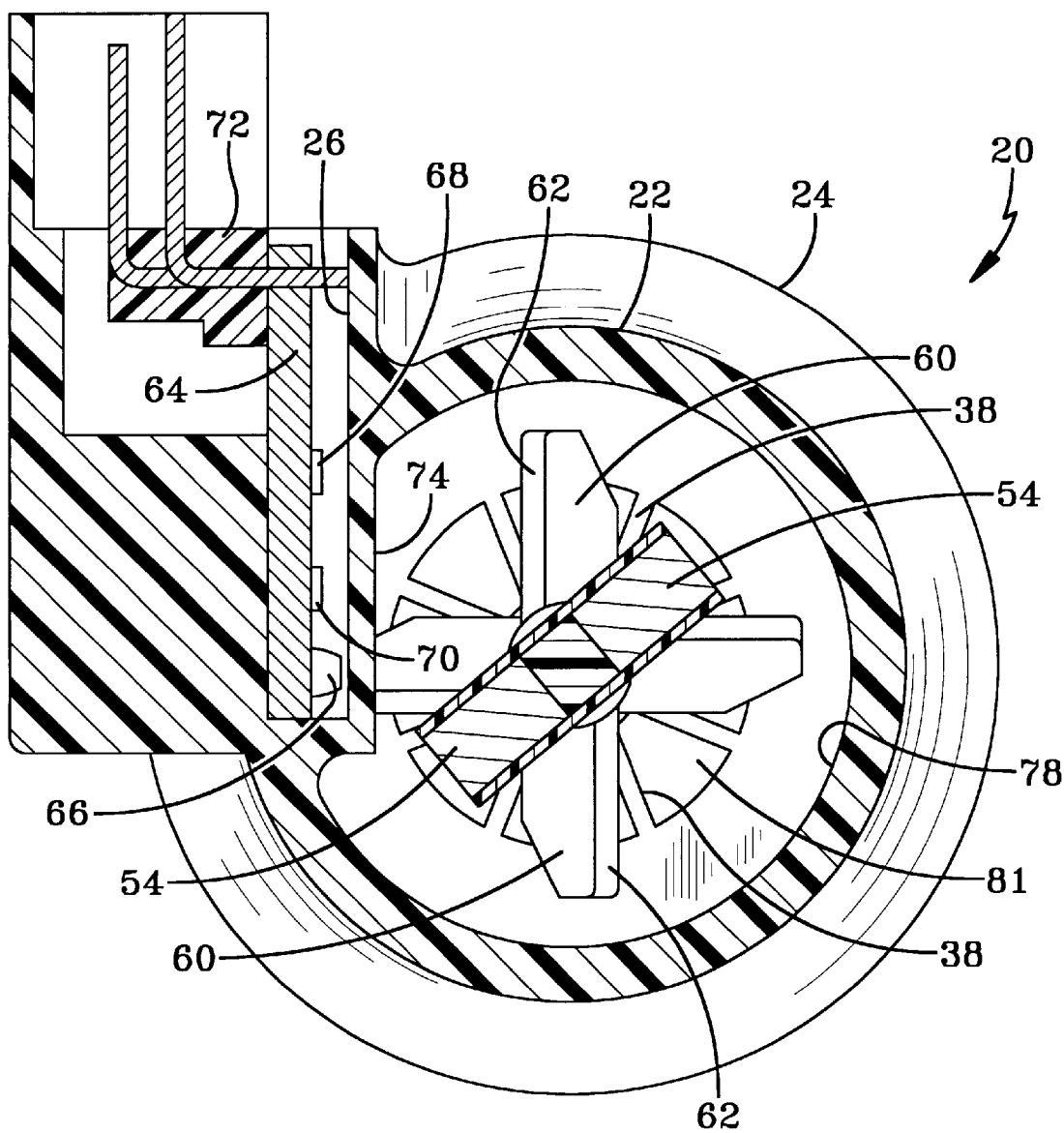
FIG. 2 is a front elevation cross-sectional view of the device of FIG. 1 taken along section line 2—2.
Figure 3:
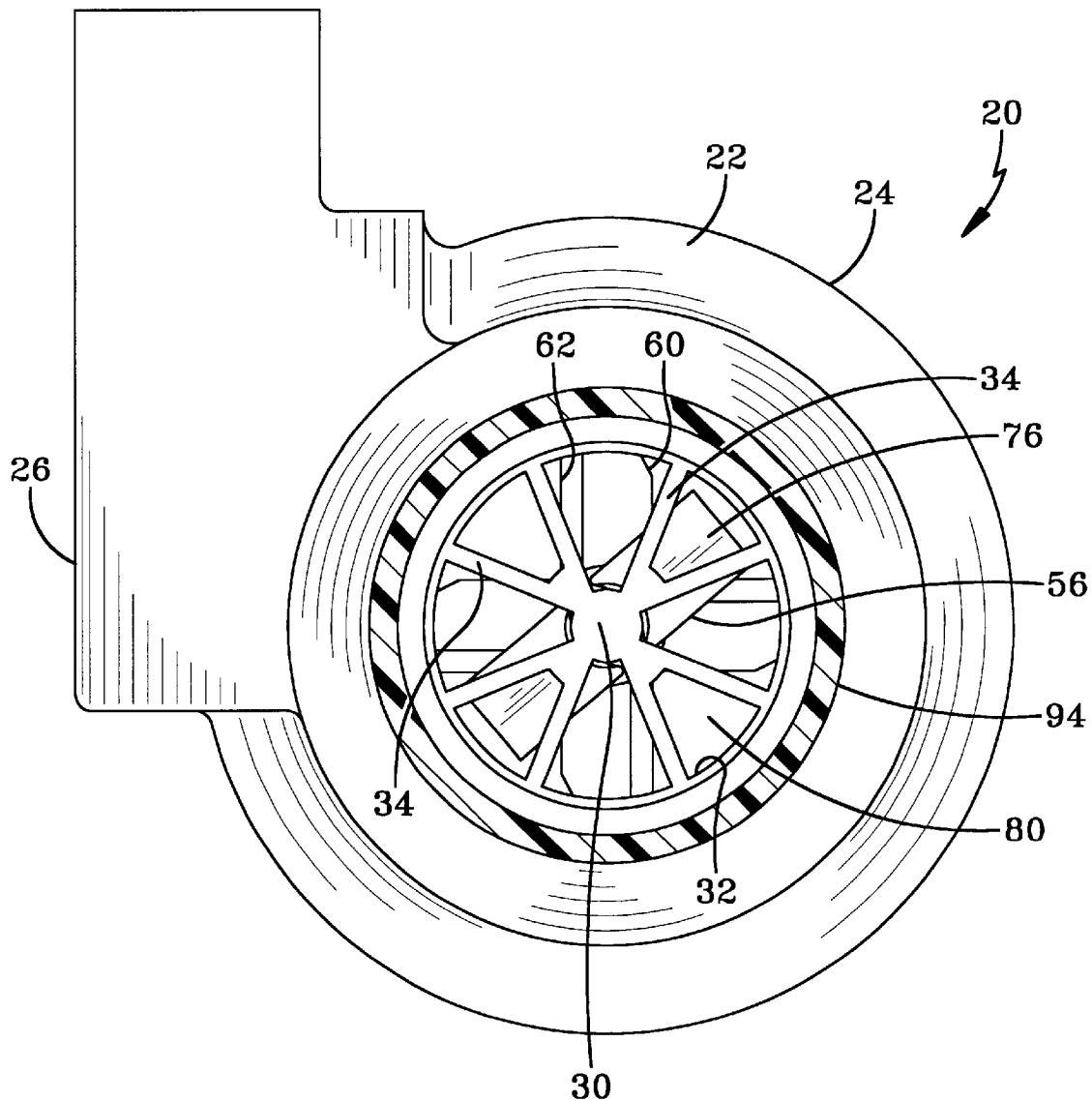
FIG. 3 is a front elevation cross-sectional view of the device of FIG. 1 taken along section line 3—3.

Referring to FIGS. 1–3 wherein like numbers refer to similar parts, a flow sensor 20 is shown in FIG. 1. The flow sensor 20 has a housing 22 that comprises an upstream portion 24, which incorporates a sensor cavity 26, and a downstream portion 28, which are joined by spin welding. The upstream housing portion 24 has an upstream bearing cup 30 supported in the center of a flow passageway 32 by a series of radial spokes 34 that position the bearing cup 30 in the center of the flow passageway 32. Fluid flows along the passageway 32 as indicated by arrows 33 while the radial spokes 34 allow substantially unobstructed fluid flow along the passageway 32. Similarly, the downstream housing portion 28 has a downstream bearing cup 36 that is also supported by radial spokes 38 which support the downstream bearing cup 36 in the center of the flow passageway 32. The downstream bearing cup 36 is surrounded by a centering cone 39.

A turbine body 40 rotates about an axis 41 defined between an upstream trunnion 42 and a downstream trunnion 44, which are received within the upstream bearing cup 30, and the downstream bearing cup 36 respectively. The upstream trunnion 42 and downstream trunnion 44 are integrally formed with the turbine body, thus avoiding the need for a metal bearing shaft. Between the upstream trunnion 42 and the downstream trunnion 44 extends a plastic turbine shaft 46. The shaft 46 has an upstream tapered section 48 which extends from the upstream trunnion 42, a central cylindrical section 50, and a rearward conical portion 52, which terminates in the downstream trunnion 44. Two magnets 54 are press fit within internally cylindrical cups 56 that extend radially outwardly from the upstream tapered section 48. The magnets 54 are cylindrical, with the axis of the magnet cylinder positioned to periodically point at the Hall effect sensor. The magnets are preferably of the Neodymium-Iron-Boron type that has a high field strength. The high field strength and the position and shape of the magnets allows the use of a Hall effect sensor which can detect rapid rotation of the magnets 54 on the turbine body 40. The magnets 54 may be sealed with polyurethane or epoxy to protect them from a fluid flowing through the sensor 20. The magnets 54 may also be sealed within the material forming the turbine body 40 by the process of overmolding or insert molding.

Four equally spaced blades 58 are positioned about the central cylindrical section 50 of the turbine body 40. Each blade 58 is divided into two portions approximately equally long in the axial direction. The upstream portion 60 is angled with respect to the axis 41 twenty degrees (0.35 radians), and the downstream portion 62 is angled with respect to the axis 41 six degrees (0.105 radians). Both portions of the blades 58 are more nearly parallel to the axis 41 of the turbine body 40, than is the case with fan type turbine flow sensors. The blades 58 extending along the turbine body are more parallel than not to the axis 41, in contrast to paddlewheel type turbine blades.

As shown in FIG. 2, a circuit board 64 is positioned within the sensor cavity 26. A Hall effect sensor 66 is mounted on the circuit board, and a resistor 68 is connected across the output of the Hall effect sensor to increase the voltage output. The circuit board 64 is positioned so the magnets 54 pass closely by the Hall effect Sensor 66. In addition, a temperature sensor 70 may also be located on the circuit board 64. A connector 72 is joined to the circuit board and extends from the sensor cavity 26 as shown in FIG. 2. The connector 72 adapts the sensor 20 to function with customer-supplied monitoring circuits.

The sensor cavity 26 is separated from the flow passageway 32 by a relatively thin but impermeable wall 74. The cavity 26 may be filled with potting compound such as epoxy or polyurethane. The sensor housing 22 including the impermeable wall 74 is constructed of Modified PPO (Noryl®) or PPS (Polyphenylene sulphide) PPO (Modified Polyphenylene Oxide). These materials and the potting compound are relatively conductive of heat, and thus the temperature sensor 70 will be relatively accurate and will relatively rapidly perceive a temperature change in the fluid flowing through the flow sensor 20. Monitoring water temperature can be useful in boiler feed situations as well as hot water heating systems. In addition, the accuracy of the flow meter can be increased by correcting for temperature induced density variations in water flowing through the sensor 20.

The turbine body 40 with integrally formed trunnions 42, 44 will preferably be made of a plastic with a low coefficient of friction to minimize bearing friction. Examples of suitable materials are POM (polyacetal engineering polymers) with 1–5 percent-added Polytetrafluoroethylene (PTFE) to reduce friction and wear between components.

The turbine body 40 is designed for minimal fluid resistance while at the same time good performance at low velocities. This is accomplished by streamlining the cylindrical cups 56, which hold the magnets 54, so that the cups 56 are given a teardrop shape by upstream portions 76. The upstream portion 60 of the turbine blades 58 extend to nearly completely encompass the radial diameter of a central volume 78 between the upstream bearing cup 30 and the downstream bearing cup 36. More importantly, the blades extend beyond the flow passageway 32 defined between an inlet 80 at the upstream radial spokes 34, and an outlet 81 defined by the downstream radial spokes 38. The upstream portion 60 of the turbine blades also has a relatively large angle of attack of twenty degrees to assure rotation of the turbine body 40 at low flow rates. At the same time, a relatively small angle of attack of six degrees of the downstream portion 62 of the blades 58 help the blades function at high velocity while still allowing a considerable clear area along the turbine within the flow passageway 32 as shown in FIG. 2.

The precision with which the flow sensor 20 operates can be increased by combining temperature compensation together with calibration that accounts for increased frictional losses at higher flow rates.

The simplicity of the flow sensor 20 is increased by joining the upstream housing portion 24 to the downstream housing portion 28 by spin welding. Spin welding allows the rapid and high-quality joining of two parts where the mating portions are circular, as seen in the lower portion of FIG. 1 in which the upstream housing 24 has been broken away and a mating structure separated from the receiving structure on the downstream portion 28. As is understood by those skilled in the art, a spin weld joint such as shown in FIG. 1 may have a number of configurations conforming to the rules which have been developed to provide reliable spin wild joints.

The structure as shown in FIG. 1 has a conical ring 82 which has a cone angle which is slightly smaller than the cone angle of a conical groove 84, and a cone height which is slightly higher than the depth of the grooves 84. Two U-shaped grooves 86 are formed on the radially outwardly extending sides of the conical ring 82 and conical groove 84. The two U-shaped grooves 86 define a flash 87 retaining structure, which prevents the flash 87 formed during the spin welding process from extending beyond the housing 22. The spin formed joint 88 should not result in any inwardly extending flash, and a gap 90 exists between the blades 58 and the housing inner wall 92.

The welding process is accomplished by holding the upstream portion 24 of the housing 22 so that the conical ring 82 points upwardly, and positioning the turbine body 40 with the upstream trunnion 42 in the upstream bearing cup 30. The turbine body 40 may be held with a mechanical or a magnetic fixture that holds the turbine body 40 in the vertical position. The downstream portion 28 of the housing is rapidly rotated and driven down against the upstream portion 24 the housing, the centering cone 39 which surrounds the downstream bearing cup 36, may facilitate the downstream trunnion 44 entering into the bearing cup 36.

The flow sensor 20 is easily integrated directly with a pipe and utilizes only a little more space than the pipe alone. The upstream housing portion 24 has a pipe section 94 that can be bonded, retained in a compression fitting or push fit back on to join the flow sensor 20 to a pipe. Similarly, the downstream portion 28 has a pipe section 96 which may be bonded, retained in a compression fitting, or push fit to a downstream pipe.

It should be understood that the flow sensor 20 may be designed for use with pipes of various sizes. In particular, the flow sensor illustrated in FIG. 1 is designed to mate with a pipe having an exterior diameter of 15 mm, which is received within the pipe section 94, and the pipe section 96. A flow sensor having a scale to join with a 15-mm exterior diameter pipe employs magnets having a diameter of 3 mm and a height of 5 mm.

A standard is defined by BS EN 60529 for the notation of the level of protection provided by enclosures of electrical equipment against the environment. The sensor housing 22, with the encapsulated sensor and the overall construction of the flow sensor 20 allows a sensor in accordance with this disclosure to be built to the IP67 standard. To further test the sensor 20 to assure no leaks are present, a test pressure of approximately 15 atmospheres may be applied to test the integrity of the spin weld.

It should be understood that the Hall effect sensor 66 may be a standard digital pulsing type, analog sensor, or a latching sensor depending on the end user. It should also be understood that other magnetic field sensors such as a Giant Magnetoresistive (GMR) device. In addition, for low turbine speeds a reed switch could be used. The high-strength magnets, particularly the Neodymium-Iron-Boron type, make practical using a Hall effect sensor to monitor high turbine rotation speeds.

Typically all materials which come into contact with water, within the sensor 20 will meet the various regulatory requirements (e.g. in England, the Water Regulatory Council) for materials coming into contact with potable water.

It is understood that the invention is not limited to the particular construction and arrangement of parts herein illustrated and described, but embraces all such modified forms thereof as come within the scope of the following claims.

I claim:

1. A flow meter comprising:
   a plastic housing defining a substantially straight flow passageway between an inlet pipe section and an outlet pipe section, the plastic housing further having portions defining a central volume which is part of the flow passageway, the central volume being between the inlet pipe section and the outlet pipe section, the plastic housing having a first portion and a second portion joined together by a spin weld, the joint being defined by a flash catching structure;
   a plastic turbine body defining an axis of rotation and having a plurality of blades which are more parallel than not to the axis, the plastic turbine body mounted for rotation about the axis within the central volume, the plastic turbine body having an upstream end which is mounted to portions of the plastic housing to form an upstream bearing, the turbine body having a downstream end, mounted to portions of the plastic housing to form a downstream bearing, the rotation axis lying substantially parallel to the straight flow passageway between the inlet pipe section and the outlet pipe section;
   at least one magnet mounted to the plastic turbine body to rotate with the plastic turbine body;
   wherein the plastic housing has portions defining a sensor cavity which is separated from the flow passageway by portions of the plastic housing, so that fluid cannot move between the flow passageway and the sensor cavity; and
   a magnetic field sensor positioned within the sensor cavity to detect rotation of the at least one magnet mounted on the plastic turbine body.

2. The flow meter of claim 1 wherein there are two Neodymium-Iron-Boron magnets mounted to the plastic turbine body.

3. The flow meter of claim 1 wherein the plastic housing is constructed of a material chosen from the group consisting of Modified Polyethylene Oxide and Polyphenylene Ether.

4. The flow meter of claim 1 wherein magnet the turbine body is constructed of POM (polyacetal engineering polymers) with added Polytetrafluoroethylene (PTFE) to reduce friction.

5. A flow meter comprising:
   a plastic housing defining a substantially straight flow passageway between an inlet pipe section and an outlet pipe section, wherein the plastic housing further has portions defining a central volume which is part of the flow passageway, the central volume being between the inlet pipe section and the outlet pipe section, the plastic housing having a first portion and a second portion joined together by a spin weld, the joint being defined by a flash catching structure;
   a plastic turbine body defining an axis of rotation and having a plurality of blades which are more parallel than not to the axis, the plastic turbine body mounted for rotation about the axis within the central volume, the rotation axis lying substantially parallel to the straight flow passageway between the inlet pipe section and the outlet pipe section;
   at least one Neodymium-Iron-Boron magnet mounted to the plastic turbine body to rotate with the plastic turbine body;
   wherein the plastic housing has portions defining a sensor cavity which is separated from the flow passageway by portions of the plastic housing, so that fluid cannot move between the flow passageway and the sensor cavity; and
   a Hall effect sensor positioned within the sensor cavity to detect rotation of the at least one magnet mounted on the plastic turbine body.

6. The flow meter of claim 5 wherein there are two Neodymium-Iron-Boron magnets mounted to the plastic turbine body.

7. The flow meter of claim 5 wherein the plastic housing is constructed of a material chosen from the group consisting of Modified Polyethylene Oxide and Polyphenylene Ether.

8. The flow meter of claim 5 magnet the turbine body is constructed of POM (polyacetal engineering polymers) with added Polytetrafluoroethylene (PTFE) to reduce friction.

9. A flow meter comprising:
   a plastic housing defining a substantially straight flow passageway between an inlet pipe section and an outlet pipe section, the plastic housing further having portions defining a central volume which is part of the flow passageway, the central volume being between the inlet pipe section and the outlet pipe section, the plastic housing having a first portion and a second portion joined together by a spin weld, the joint being defined by a flash catching structure;
   a plastic turbine body having the following portions which are axially symmetric about an axis of rotation: an upstream trunnion, a forward conical portion, a central cylindrical section, a rearward conical portion, and a downstream trunnion, the upstream trunnion and the downstream trunnion mounted to portions of the plastic housing to form bearings which support the turbine body in rotation;
   a plurality of blades extending from the central cylindrical section of the turbine body;
   at least two magnets mounted to the forward conical portion of the plastic turbine body by portions of the plastic turbine body which form radially extending magnet-receiving openings to hold the magnets for rotation with the plastic turbine body;
   wherein the plastic housing has portions defining a sensor cavity positioned radially outwardly of the forward conical portion of the plastic turbine body, the sensor cavity being separated from the flow passageway by portions of the plastic housing, so that fluid cannot move between the flow passageway and the sensor cavity;
   a magnetic field sensor positioned within the sensor cavity to detect rotation of the at least two magnets mounted on the plastic turbine body.

10. The flow sensor of claim 9 wherein the portions of the plastic turbine body which form radially extending magnet-receiving openings have teardrop-shaped, upstream portions to reduce drag.

11. The flow meter of claim 9 wherein the two magnets are of the Neodymium-Iron-Boron type.

12. The flow meter of claim 9 wherein the plastic housing is constructed of a material chosen from the group consisting of Modified Polyethylene Oxide and Polyphenylene Ether.

13. The flow meter of claim 9 wherein the turbine body is constructed of POM (polyacetal engineering polymers) with added Polytetrafluoroethylene (PTFE) to reduce friction.

* * * * *